US008582332B2

(12) United States Patent
Verma et al.

(10) Patent No.: US 8,582,332 B2
(45) Date of Patent: Nov. 12, 2013

(54) DUAL OUTPUT DC-DC CHARGE PUMP REGULATOR

(75) Inventors: Ashutosh Verma, Santa Clara, CA (US); Shafiq M. Jamal, Gilroy, CA (US); Thomas B. Cho, Fremont, CA (US); Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 428 days.

(21) Appl. No.: 13/026,938

(22) Filed: Feb. 14, 2011

(65) Prior Publication Data

US 2011/0204724 A1 Aug. 25, 2011

Related U.S. Application Data

(60) Provisional application No. 61/306,795, filed on Feb. 22, 2010, provisional application No. 61/306,822, filed on Feb. 22, 2010, provisional application No. 61/355,952, filed on Jun. 17, 2010.

(51) Int. Cl.
*H02M 3/07* (2006.01)

(52) U.S. Cl.
USPC ............................................ 363/59; 363/60

(58) Field of Classification Search
USPC ............................................ 363/59, 60, 62
See application file for complete search history.

(56) References Cited

U.S. PATENT DOCUMENTS 4,797,899 A * 1/1989 Fuller et al. .................. 375/219
4,807,104 A * 2/1989 Floyd et al. .................... 363/59
5,532,916 A * 7/1996 Tamagawa ..................... 363/62
5,606,491 A * 2/1997 Ellis ................................ 363/60
6,756,772 B2 6/2004 McGinnis
6,859,091 B1 2/2005 Nicholson et al.
6,960,955 B2 * 11/2005 Nonaka ......................... 327/536
7,282,985 B2 * 10/2007 Yen et al. ...................... 327/536
2005/0213356 A1 * 9/2005 Yanagida et al. ............... 363/59
2007/0211503 A1 * 9/2007 Oyama et al. .................. 363/62
2008/0007981 A1 * 1/2008 Erbito ............................ 363/60
2008/0013349 A1 * 1/2008 Yanagida et al. ............... 363/60
2008/0031023 A1 * 2/2008 Kitagawa et al. ............... 363/59
2008/0088179 A1 4/2008 Oyama et al.
2008/0150619 A1 6/2008 Lesso et al.
2009/0231176 A1 9/2009 Chen et al.
2009/0273955 A1 * 11/2009 Tseng et al. .................... 363/60
2011/0204724 A1 * 8/2011 Verma et al. ................. 307/109

OTHER PUBLICATIONS

PCT International Search Report, Application No. PCT/US20111024751, May 19, 2011.

* cited by examiner

*Primary Examiner* — Jeffrey Sterrett

(57) ABSTRACT

An apparatus includes a first switch coupled to a first voltage reference and a second switch coupled to a second voltage reference. A third switch is coupled to a first terminal of a first capacitor and a first terminal of a second capacitor. A fourth switch is coupled to a second terminal of the first capacitor and the first terminal of the second capacitor. A fifth switch is coupled to the second terminal of the first capacitor and a first terminal of a third capacitor. A sixth switch is coupled to the first terminal of the first capacitor and the first terminal of the third capacitor. The first switch, the second switch, the third switch, the fourth switch, the fifth switch, and the sixth switch are controlled to maintain a first voltage level at a first output and a second voltage level at a second output.

20 Claims, 11 Drawing Sheets

100

Vdd
P1
SW1
P2
SW5
SW4
V18
P4
Cf
P5
V12
C18
P3
C12
SW6
SW3
SW2
P6
GND

100

Vdd

DUAL OUTPUT DC-DC CHARGE PUMP REGULATOR

CROSS REFERENCE TO RELATED APPLICATIONS

The present disclosure claims priority to U.S. Provisional App. No. 61/306,796 for “Dual Flycap Dual Output DC-DC Regulator” filed Feb. 22, 2010; U.S. Provisional App. No. 61/306,822 for “Dual Output DC-DC Regulator” filed Feb. 22, 2010; and U.S. Provisional App. No. 61/355,952 for “Dual Output DC-DC Switched Capacitor Regulator” filed Jun. 17, 2010, all of which are incorporated herein by reference in their entirety for all purposes.

BACKGROUND

Particular embodiments generally relate to a dual output direct current (DC)-to-DC regulator.

Unless otherwise indicated herein, the approaches described in this section are not prior art to the claims in this application and are not admitted to be prior art by inclusion in this section.

A charge pump is a DC-to-DC converter that uses capacitors to create either a higher or lower voltage output. Charge pumps use switches to control different connections for the capacitors. For example, in a first phase, a flying capacitor is connected to a voltage supply to charge the flying capacitor. In a second phase, the flying capacitor is disconnected from the voltage supply and connected to a second capacitor at an output. Charge then flows from the flying capacitor to the second capacitor, which increases the voltage across the second capacitor. The above process between the first phase and the second phase continues at a pre-determined frequency. The process regulates the output voltage across the second capacitor to maintain the output voltage a desired level.

The charge pump regulates the output voltage at a single output. However, if multiple outputs are required, then an additional flying capacitor, an additional output capacitor, and an additional set of switches are needed to regulate the second output. This may be an inefficient use of integrated circuit (IC) chip area.

SUMMARY

In one embodiment, an apparatus includes a first switch coupled to a first voltage reference and a second switch coupled to a second voltage reference. A third switch is coupled to a first terminal of a first capacitor and a first terminal of a second capacitor. A fourth switch is coupled to a second terminal of the first capacitor and the first terminal of the second capacitor. A fifth switch is coupled to the second terminal of the first capacitor and a first terminal of a third capacitor. A sixth switch is coupled to the first terminal of the first capacitor and the first terminal of the third capacitor. The first switch, the second switch, the third switch, the fourth switch, the fifth switch, and the sixth switch are controlled to maintain a first voltage level at a first output and a second voltage level at a second output.

In one embodiment, the apparatus includes a seventh switch coupled to the first voltage reference and an eighth switch coupled to the second voltage reference. A ninth switch is coupled to a first terminal of a fifth capacitor and the first terminal of the second capacitor. A tenth switch is coupled to a second terminal of the fifth capacitor and the first terminal of the second capacitor. An eleventh switch is coupled to the second terminal of the fifth capacitor and the first terminal of the third capacitor. A twelfth switch is coupled to the first terminal of the fifth capacitor and the first terminal of the third capacitor.

In one embodiment, a system includes the first reference voltage; the second reference voltage; the first capacitor; the second capacitor; and the third capacitor.

In one embodiment, a method includes: coupling a first switch coupled to a first voltage reference; coupling a second switch coupled to a second voltage reference; coupling a third switch coupled to a first terminal of a first capacitor and a first terminal of a second capacitor; coupling a fourth switch coupled to a second terminal of the first capacitor and the first terminal of the second capacitor; coupling a fifth switch coupled to the second terminal of the first capacitor and a first terminal of a third capacitor; coupling a sixth switch coupled to the first terminal of the first capacitor and the first terminal of the third capacitor, and controlling the first switch, the second switch, the third switch, the fourth switch, the fifth switch, and the sixth switch to maintain a first voltage level at a first output and a second voltage level at a second output.

The following detailed description and accompanying drawings provide a more detailed understanding of the nature and advantages of the present invention.

DETAILED DESCRIPTION

Described herein are techniques for a regulator. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Single Flying Capacitor

Figure 1:
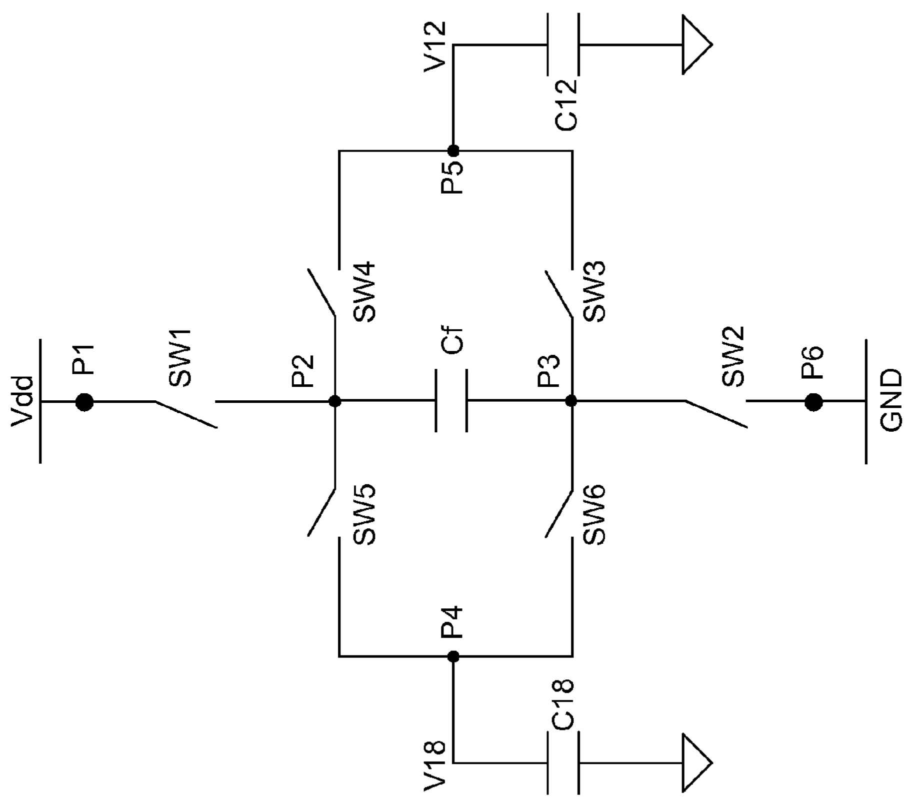
FIG. 1 depicts an example of a regulator according to one embodiment.

FIG. 1 depicts an example of a regulator 100 according to one embodiment. Regulator 100 maintains output voltages at dual outputs (e.g. output V12 and output V18). A switched capacitor design transfers charge among a flying capacitor (Cf), a first output capacitor (C12), and a second output capacitor (C18). In one example, output V12 is maintained substantially at 1.2 volts, output V18 is maintained substantially at 1.8 volts, and a voltage reference Vdd is at 3.3 volts. Although these voltages are described, other voltages may be used.

In one embodiment, an IC chip includes switches SW1-SW6. Voltage reference Vdd, voltage reference GND, and capacitors Cf, C12, and C18 are located off chip. In regulator 100, multiple switches, such as switches SW1, SW2, SW3, SW4, SW5, and SW6, are controlled in different switching schemes. Switch SW1 couples reference voltage Vdd to flying capacitor Cf through pins P1 and P2 of the chip. Switch SW2 couples flying capacitor Cf to a second reference voltage, such as ground (GND), through pins P3 and P6. Switch SW3 couples capacitor C12 to a first terminal of flying capacitor Cf through pins P3 and P5. Switch SW4 couples capacitor C12 to a second terminal of flying capacitor Cf through pins P2 and P5. Also, switch SW5 and switch SW6 couple capacitor C18 to the second terminal (through pins P4 and P2) and the first terminal (through pins P4 and P3) of flying capacitor Cf, respectively. Capacitors C12 and C18 are also coupled to ground.

A switching scheme is performed based on the output voltages at outputs V12 and V18. Each case may include two phases that are switched between according to a reference signal. The switching scheme that is used may be determined based on voltages at outputs V12 and V18 and couple capacitors Cf, C12, and C18 in different paths. A high efficiency is provided and a total resistance of a critical path is less than total resistance restrictions due to characteristics of a layout for the design.

Figure 2A:
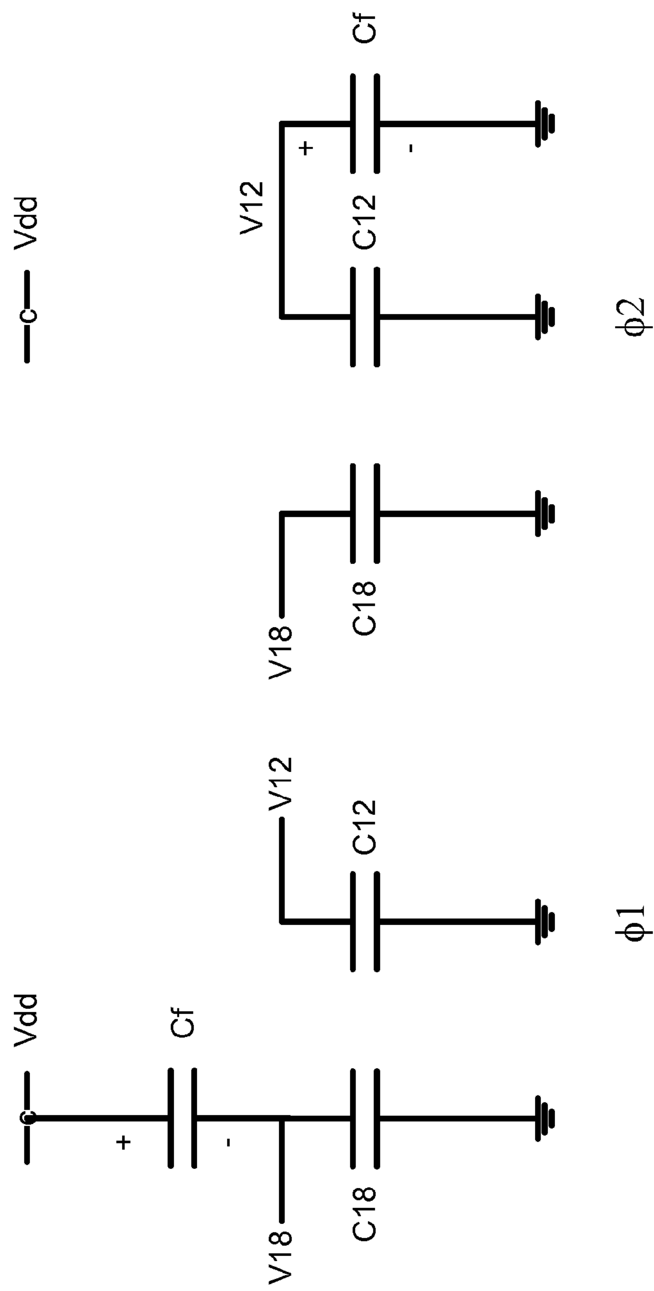
FIG. 2*a* depicts a first case in the switching scheme according to one embodiment.

FIG. 2a depicts a first case in the switching scheme according to one embodiment. The first case may be used when the following high and low voltages for outputs V12 and V18 are found:

V12H<1.2;

V18H<1.8;

V12L>1.15; and

V18L>1.75, wherein H denotes the high voltage measured and L denotes the low voltage measured at outputs V12 or V18. In this case, both the high voltages at outputs V12 and V18 are below the desired levels. Thus, the switching scheme attempts to increase the voltages at outputs V12 and V18 to maintain them at 1.2 volts and 1.8 volts, respectively.

In phase 1 ($\phi$1), switches SW1 and SW6 are closed and switches SW2, SW3, SW4, and SW5 are open. This couples the second terminal of the flying capacitor Cf to the reference voltage Vdd and the first terminal of the flying capacitor Cf to output V18. Also, capacitor C12 is coupled to output V12.

The voltage at the second terminal of flying capacitor Cf will be Vdd−V18=1.5 volts. The voltage across flying capacitor Cf starts at 1.2 volts (the starting voltage across flying capacitor Cf is from phase 2, which is described below). Thus, there is a voltage difference ΔV of 0.3 volts. If capacitor C18 is of a sufficiently large size, then the voltage across capacitor C18 remains at 1.8 volts. The current used to charge flying capacitor Cf to the voltage of Vdd−V18 then flows to a load coupled to output V18, which increases the voltage at the load (and output V18).

In phase 2 ($\phi$2), switches SW2 and SW4 are closed and switches SW1, SW3, SW5, and SW6 are open. Capacitor C18 is coupled to the load at output V18. Also, flying capacitor Cf is coupled to capacitor C12. The voltage at the second terminal of flying capacitor Cf is Vdd−V18. If the voltage Vdd−V18 is greater than the voltage across capacitor C12, which is less than 1.2 volts, then charge flows from flying capacitor Cf to capacitor C12. Flying capacitor Cf and capacitor C12 will eventually equal the same charge. For example, if the voltage across flying capacitor Cf is 3.3−1.8=1.5 volts, then a voltage difference ΔV of 0.3 volts may be used to charge capacitor C12. This may be enough voltage to charge capacitor C12 to the desired level of 1.2 volts. The frequency of the switching scheme may switch back to phase 1 at a time around when capacitor C12 is charged to 1.2 volts.

The voltages across capacitors Cf, C12, and C18 do not change significantly between phase 1 and phase 2. Thus, the efficiency of regulator 100 is high, such as around 91%. Additionally, both outputs V12 and V18 are charged using flying capacitor Cf and switches SW1-SW6. For example, in phase 1, output V18 is charged, and in phase 2, output V12 is charged.

Figure 2B:
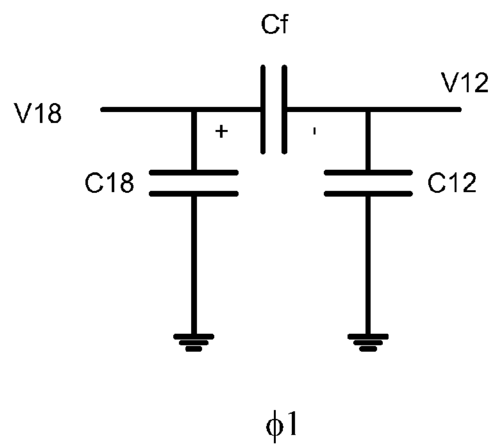
FIG. 2*b* depicts a second case for the switching scheme according to one embodiment.
Figure 2B:
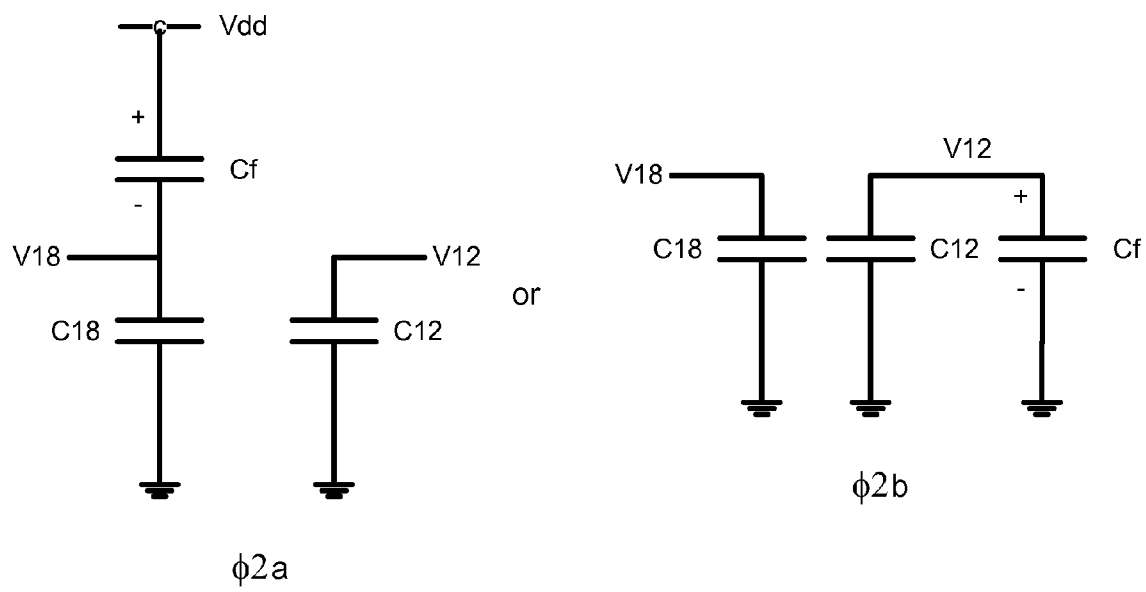

FIG. 2b depicts a second case for the switching scheme according to one embodiment. The second case may be used when the following high and low voltages for outputs V12 and V18 are found:

V12H>1.2;

V18H<1.8; and either V18L<1.75; or

V12L<1.15.

In one embodiment, in phase 1, the switches are controlled such that the voltage at output V18 is increased. For example, switches SW3 and SW5 are closed while switches SW1, SW2, SW4 and SW6 are open. This couples capacitor C12 to the first terminal of flying capacitor Cf and to the output V12. Also, capacitor C18 is coupled to the second terminal of flying capacitor Cf and output V18.

The charge across flying capacitor Cf may be Vdd−V18=1.5 volts. In this case, charge flows to capacitor C18, which is below 1.8 volts. This increases the voltage at output V18.

Different configurations may be used in phase 2. For example, in phase 2a, switches SW1 and SW6 are closed while switches SW2, SW3, SW4, and SW 5 are open. This circuit configuration is the same as discussed with respect to phase 1 in the first case in FIG. 2a. In this case, flying capacitor Cf is charged and current flows to the load at output V18. This increases the voltage at output V18. Accordingly, the voltage at output V18 is increased in both phases.

In another embodiment, instead of charging flying capacitor Cf using the configuration in phase 2a, capacitor C12 may be used to charge flying capacitor Cf in a phase 2b. For example, if the voltage across capacitor C12 is greater than 1.2 volts, then the charge from capacitor C12 may be used to charge flying capacitor Cf However, if the low voltage at output V12 is V12L<1.15, then the configuration shown in phase 2a of FIG. 2a may be used because the low voltage across capacitor C12 is less than 1.2 volts and it may not be desirable to use capacitor C12 to charge flying capacitor Cf.

In phase 2b, switches SW2 and SW4 are closed while switches SW1, SW3, SW5, and SW6 are open. The second terminal of flying capacitor Cf is coupled to capacitor C12 at output V12. Also, capacitor C18 is coupled to output V18. The charge from capacitor C12 charges flying capacitor Cf.

Figure 2C:
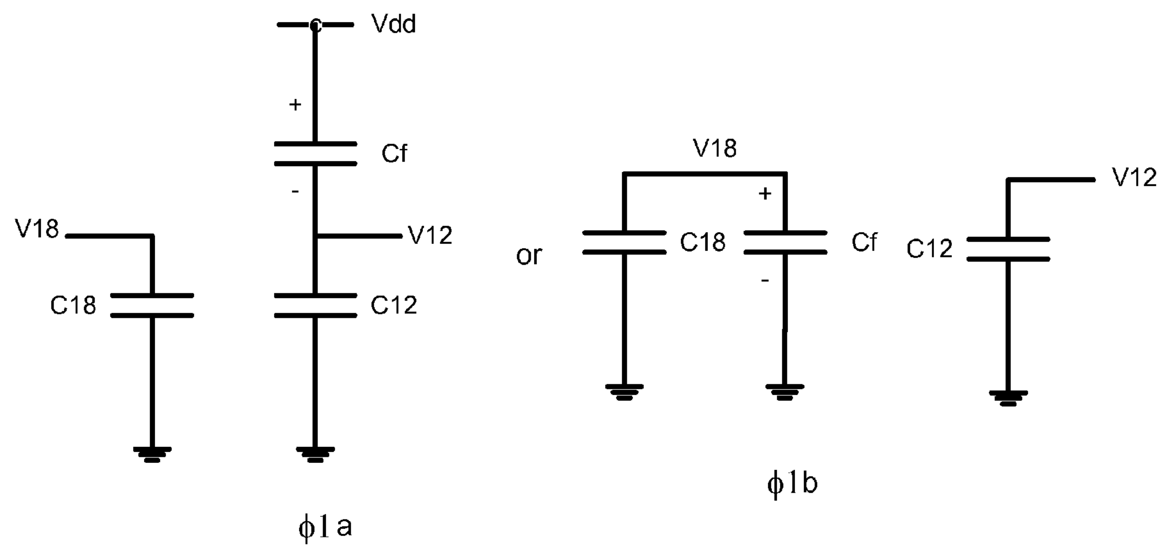
FIG. 2*c* depicts a third case in the switching scheme according to one embodiment.
Figure 2C:
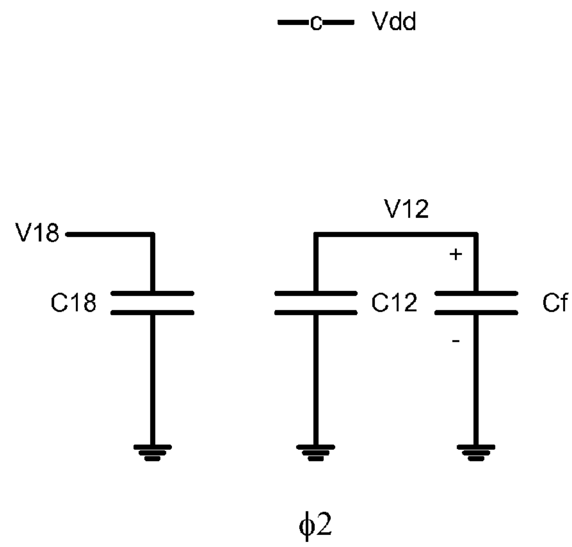

FIG. 2c depicts a third case in the switching scheme according to one embodiment. The third case may be used when the following high and low voltages for outputs V12 and V18 are found:

V12H<1.2;

V18H>1.8; and either V18L<1.75; or

V12L<1.15.

In the third case, the high voltage at output V18 is greater than 1.8 and the high voltage at output V12 is less than 1.2 volts. The low voltage for output V18 may be less than 1.75 or the low voltage at output V12 may be less than 1.15 volts. The switching scheme attempts to increase the voltage at output V12. In a phase 1*a* of the third case, the switches are controlled such that the voltage at output V12 is increased. For example, in phase 1*a*, switches SW1 and SW3 are closed and switches SW2, SW4, SW5, and SW6 are open. This couples capacitor C18 to output V18. Also, the second terminal of flying capacitor Cf is coupled to voltage reference Vdd. The first terminal of flying capacitor Cf is coupled to capacitor C12 and output V12. This configuration is similar to phase 1 of the first case in FIG. 2*a* except that flying capacitor Cf is coupled to capacitor C12 instead of capacitor C18.

The voltage at the second terminal of flying capacitor Cf will be Vdd−V12=2.1 volts. The voltage across capacitor Cf is 1.2 volts. Thus, there is a voltage difference ΔV of 0.9 volts. If capacitor C12 is of a sufficiently large size, then the voltage across capacitor C12 remains at 1.2 volts. The current used to charge flying capacitor Cf to the voltage of Vdd−V12 then flows to a load coupled to output V12, which increases the voltage at the load (and output V12).

Other configurations may also be used to charge capacitor Cf, such as a charge across capacitor C18 may be used to charge capacitor Cf as shown in phase 1*b*. However, if the low voltage for output V18 is less than 1.75, then it may not be desirable to use the charge from capacitor C18 to charge capacitor Cf. In phase 1*b*, switches SW2 and SW5 are closed and switches SW1, SW3, SW4, and SW6 are open. This couples capacitor C18 to the second terminal of flying capacitor Cf The charge across capacitor C18 charges flying capacitor Cf.

In phase 2, capacitor C18 continues to be coupled to output V18; however, switches SW2 and SW4 are closed while switches SW1, SW3, SW5, and SW6 are open. This couples the second terminal of flying capacitor Cf to output V12 and capacitor C12. The voltage across flying capacitor Cf is Vdd−V12, and charge flows from flying capacitor Cf to capacitor C12 because this voltage is greater than the voltage across capacitor C12. For example, the voltage across flying capacitor Cf may be 2.1 volts. As charge transfers from flying capacitor Cf to capacitor C12, the voltage at output V12 is increased. The frequency of the switching scheme may switch back to phase 1 at a time around when capacitor C12 is charged to 1.2 volts.

Figure 2D:
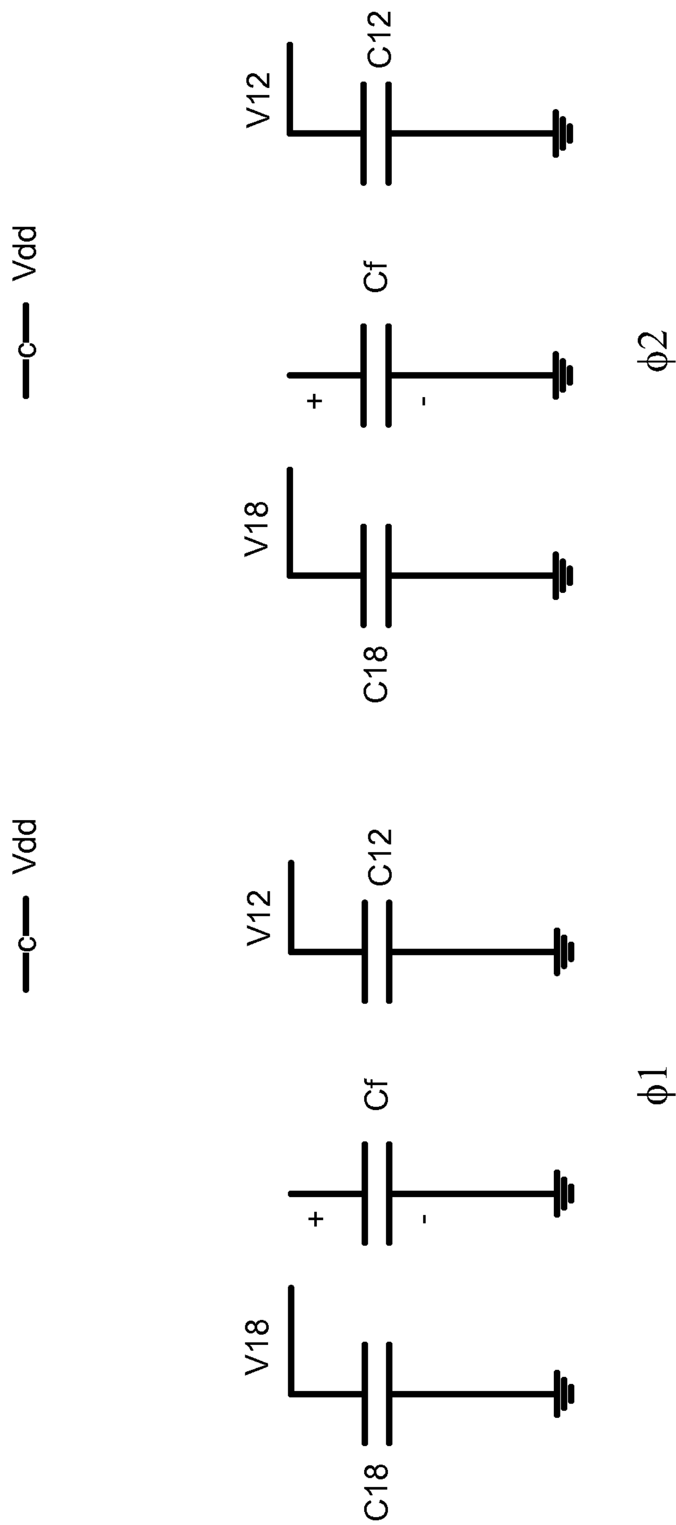
FIG. 2*d* depicts a fourth case of the switching scheme according to one embodiment.

FIG. 2*d* depicts a fourth case of the switching scheme according to one embodiment. The fourth case may be used when the following voltages for outputs V12 and V18 are found:

V12H>=1.2;

V18H>=1.8;

In this case, the voltages at output V12 and output V18 are substantially equal to or slightly above 1.2 and 1.8 volts, respectively. Accordingly, in phase 1 and phase 2, switch SW2 is closed and switches SW1, SW3, SW4, SW5, and SW6 are open. Capacitor C18 is coupled to output V18 and capacitor C12 is coupled to output V12. Flying capacitor is floating. This leaves regulator 100 in a steady state in which the voltages and outputs V12 and V18 are maintained.

The above switching schemes are efficient. The efficiency may be a measure of transferring charge from a source to a load, such as from a capacitor to a capacitor coupled to the output. The efficiencies may be high because the amount of charge transferred is low. The efficiency for the first case may be around 91%, the efficiency for the second case around 72.8%, and the efficiency for the third case around 72.8%. These efficiencies may be higher than the conventional charge pump. For a combined efficiency, each case may be multiplied by their expected occurrence and the outcomes added.

Depending on the design of regulator 100, there may be restrictions with regard to a total resistance within a path in a layout of the IC chip during a switching scheme. For example, for phase 1 of the first case, there is a voltage difference ΔV of 0.3 volts−3.3V−1.8V−1.2V (Vdd−V18−V12). Because the voltage difference ΔV is 0.3 volts, if the total resistance in the path is too high, then the time it takes to charge flying capacitor Cf may become too long or take too many time constants. Assuming the following conditions of a load current ($I_1$)=100 mA and a minimum voltage difference (ΔV)=0.3 volts, the following resistance total ($R_{TOTAL}$) may be determined using the following equations:

$$I_L = Cf \times \Delta V \times f_{osc}$$

$$R_{TOTAL} C_f = 1/2nf_{osc}$$

$$R_{TOTAL} = 1/(2nf_{osc}C_f)$$

$$R_{TOTAL} = \frac{\Delta V}{2n * I_L},$$

wherein $I_L$ is a current through the load, Cf is the capacitance of the flying capacitor, $f_{osc}$ is the frequency of the output signal, and n is the number of time constants.

This provides a resistance total that is $R_{TOTAL}$=03.75 ohms for four time constants. Four time constants may be desirable because flying capacitor Cf may be charged to 98% of the desired voltage.

Figure 3A:
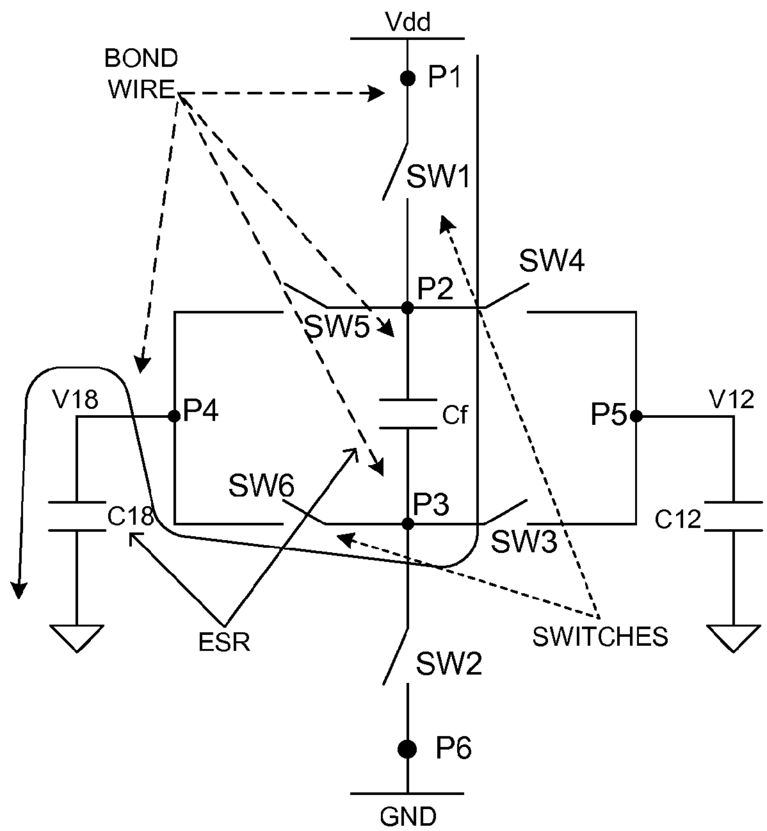
FIG. 3*a* depicts an example of a critical path according to one embodiment.

The total resistance takes into account the resistance of switches, metal wires, bond wires, and equivalent series resistance (ESR) of capacitors in the path. FIG. 3*a* depicts an example of a critical path 302 according to one embodiment. Critical path 302 couples reference voltage Vdd to flying capacitor Cf and capacitor C18. The resistances for switches SW1 and SW6, the bond wires, and the ESR of flying capacitor Cf and capacitor C18 are in the path. The bond wires are wires that couple from the IC chip to external components. For example, bond wires are needed to couple switch SW1 to reference voltage Vdd, a pin P1 to voltage reference Vdd, pins P2 and P3 to flying capacitor Cf, and pin P4 to capacitor C18.

Figure 3B:
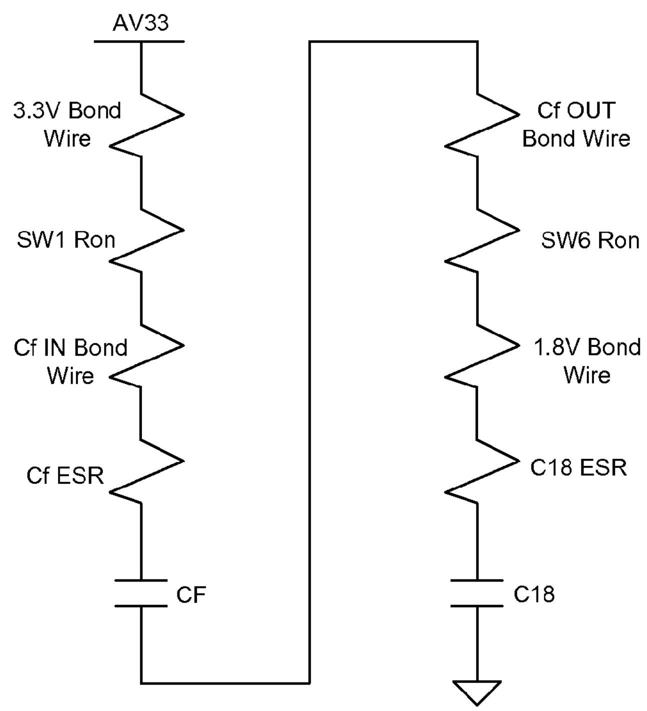
FIG. 3*b* depicts the resistances in the critical path according to one embodiment.

FIG. 3*b* depicts the resistances in the critical path according to one embodiment. As shown, the resistances for the bond wire to reference voltage Vdd (3.3V Bond Wire), switch SW1 (SW1 Ron), bond wire from pin P2 to flying capacitor Cf (Cf IN Bond Wire), and the ESR resistance for flying capacitor Cf (Cf ESR) are shown. After flying capacitor Cf, resistances for the bond wire from capacitor Cf to pin P3 (Cf OUT Bond Wire), switch SW6 (SW6 Ron), the bond wire from switch SW6 to capacitor C18 (1.8V Bond Wire), and the ESR resistance for capacitor C18 (C18 ESR) are shown. Using a double bond or triple bond wire connection, the total resistance may be below the $R_{TOTAL}$ calculated above of 0.375 ohms. The resistance may be minimized by maximizing the area of switches SW1 and SW6 and also minimizing the length of the bond wires.

Dual Flying Capacitor

Particular embodiments may use a dual flying capacitor with two outputs. The dual flying capacitors may be used because of the small ΔV in phase 1 of FIG. 2*a*. If the output current is higher than 100 mA, such as 200 mA, then the total resistance $R_{TOTAL}$ for a path may be lower than desired. The total resistance may be R=ΔV\(2*n*Ia), wherein n is a number of time constants and Ia is an output current. The total resistance depends on the voltage difference ΔV and the output current Ia. The output current Ia may be the output current at voltages V18 or V12. If the output current increases, then the total resistance allowed for a path goes down. Also, if Vdd is lower than 3.3V, such as at 3.1V, then the total resistance allowed for a path also goes down. With two switches and four bond wires in a critical path, having a smaller switch resistance may cause design difficulties. Thus, increasing the voltage difference ΔV may be beneficial.

Figure 4:
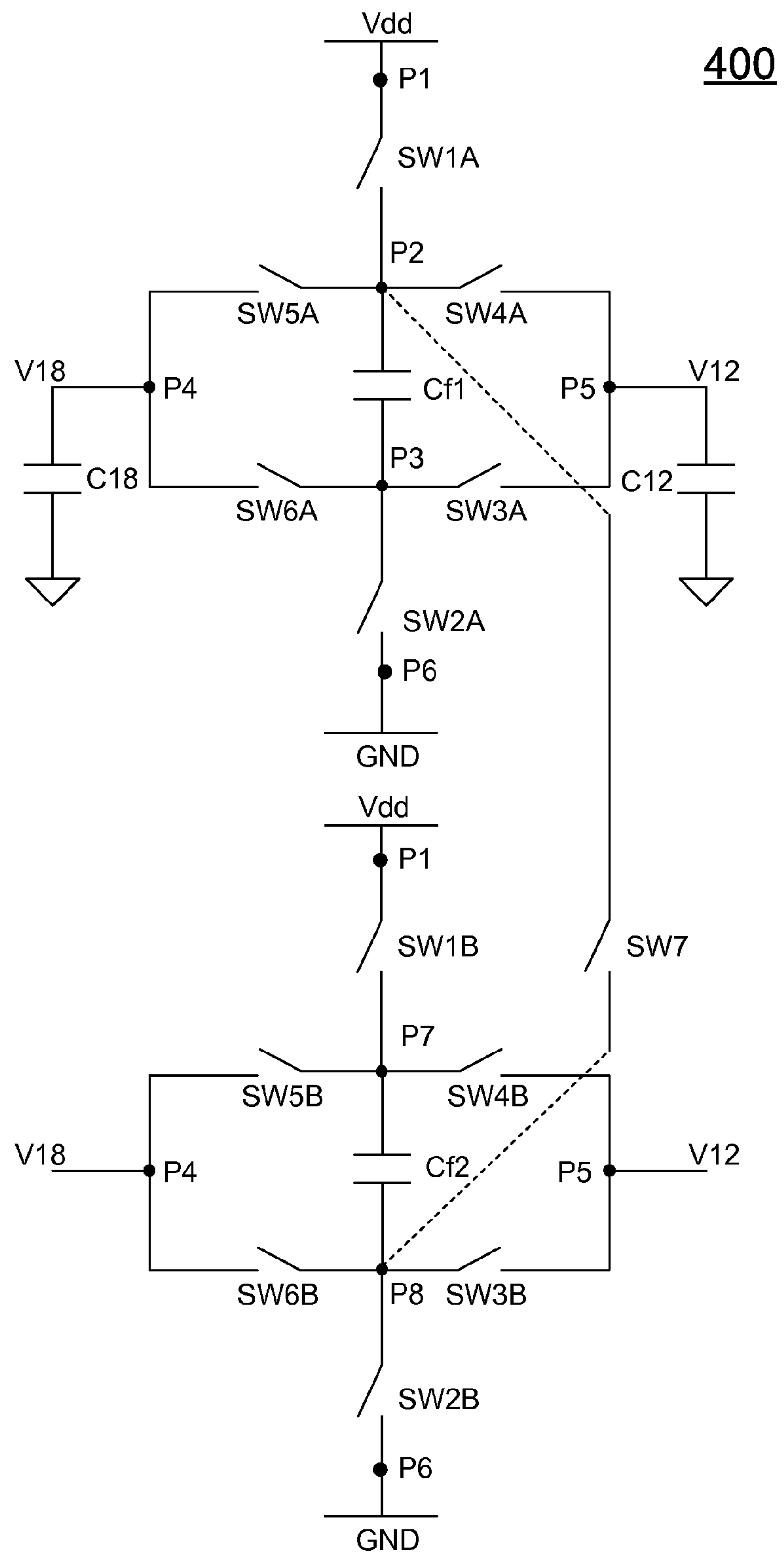
FIG. 4 depicts an example of a regulator using dual flying capacitors according to one embodiment.

FIG. 4 depicts an example of a regulator 400 using dual flying capacitors according to one embodiment. The switches of FIG. 1 may be duplicated for two flying capacitors Cf1 and Cf2. For example, flying capacitor Cf1, switches SW1A-SW6A, capacitor C12 and capacitor C18 are similar to the circuit shown in FIG. 1. An additional set of switches SW1B-SW6B and extra pins P7 and P8 are also needed in the chip. Flying capacitor Cf2 is located off chip and coupled to the chip through pins P7 and P8.

An additional switch SW7 is used when flying capacitors Cf1 and Cf2 are coupled in series. In this case, the second terminal of flying capacitor Cf1 is coupled to the first terminal of capacitor Cf2 via switch SW7. When flying capacitors Cf1 and Cf2 are coupled in parallel, then the corresponding A and B switches are closed, such as if the second terminal of flying capacitor Cf1 should be coupled to capacitor C18, then switches SW5A and SW5B are closed to couple flying capacitors Cf1 and Cf2 to capacitor C18.

Figure 5A:
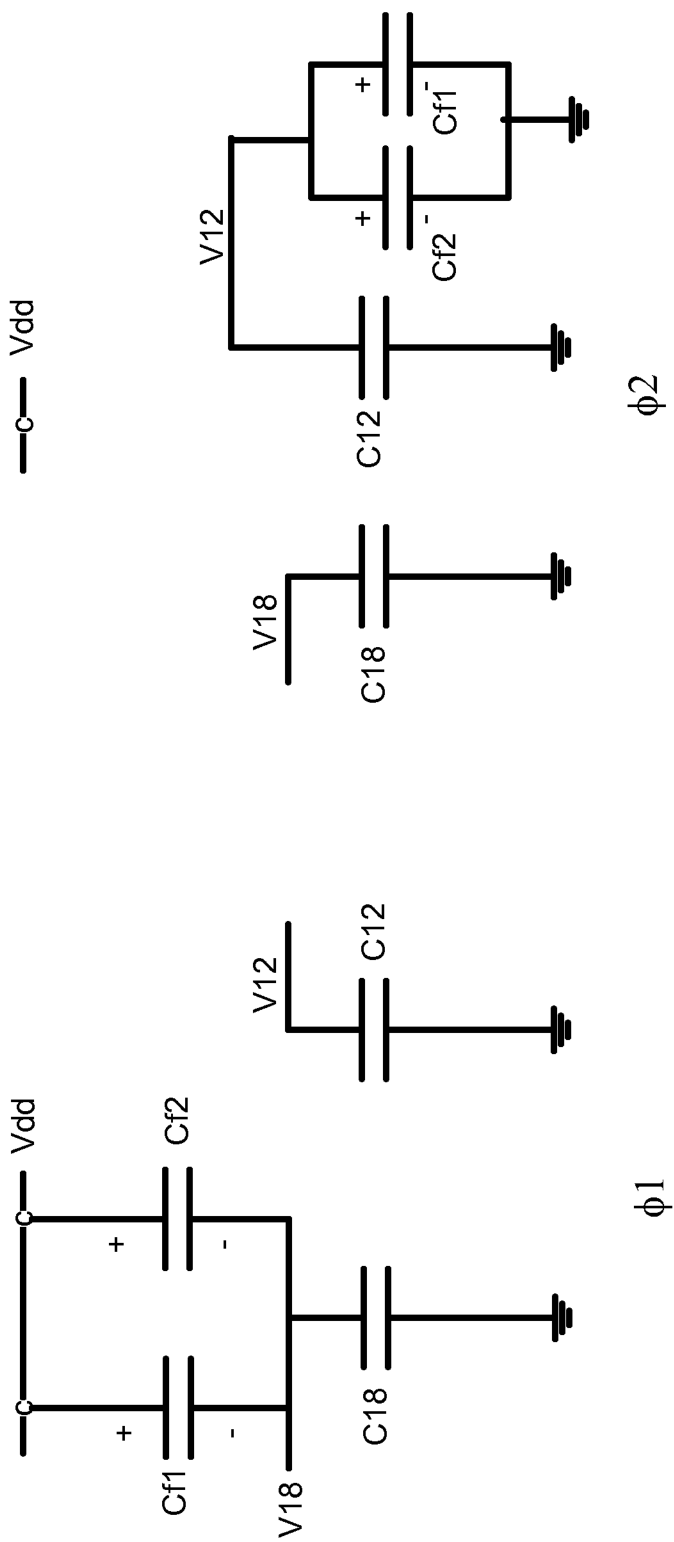
FIG. 5*a* depicts an example of using dual flying capacitors Cf1 and Cf2 in the first case of the switching scheme according to one embodiment.

FIG. 5*a* depicts an example of using dual flying capacitors Cf1 and Cf2 in the first case of the switching scheme according to one embodiment. In this case, flying capacitor Cf in FIG. 2*a* is replaced by flying capacitors Cf1 and Cf2. For example, the second terminal for flying capacitors Cf1 and Cf2 are coupled to reference voltage Vdd and the first terminal of flying capacitors Cf1 and Cf2 are coupled to capacitor C18 and output V18.

The voltage at output V18 is 1.8 volts. As will be described in more detail below, the voltage across flying capacitors Cf1 and Cf2 is 0.6 volts each. Thus, the voltage at the second terminal of flying capacitors Cf1 and Cf2 is 2.4 volts (Vdd 0.6V). A voltage difference ΔV of 0.7 volts is provided (Vdd−V18−0.5*V12=3.1V−1.8V−0.6V=0.7V).

In phase 2, capacitor C12 is coupled to flying capacitors Cf2 and Cf1. The voltage across flying capacitors Cf2 and Cf1 is Vdd−V18 volts and is transferred to capacitor C12 until the charge across both flying capacitors Cf1 and Cf2 is 1.2 volts. Thus, the charge is 0.6 volts across each flying capacitor Cf1 and Cf2.

By having a larger ΔV, the resistance $R_{TOTAL}$=ΔV\(2*n*Ia)=438 milliohms for four time constants. This gives a larger margin for switch sizes, bond wire resistance, and capacitor ESR, if the output current is larger or the reference voltage Vdd is smaller.

Figure 5B:
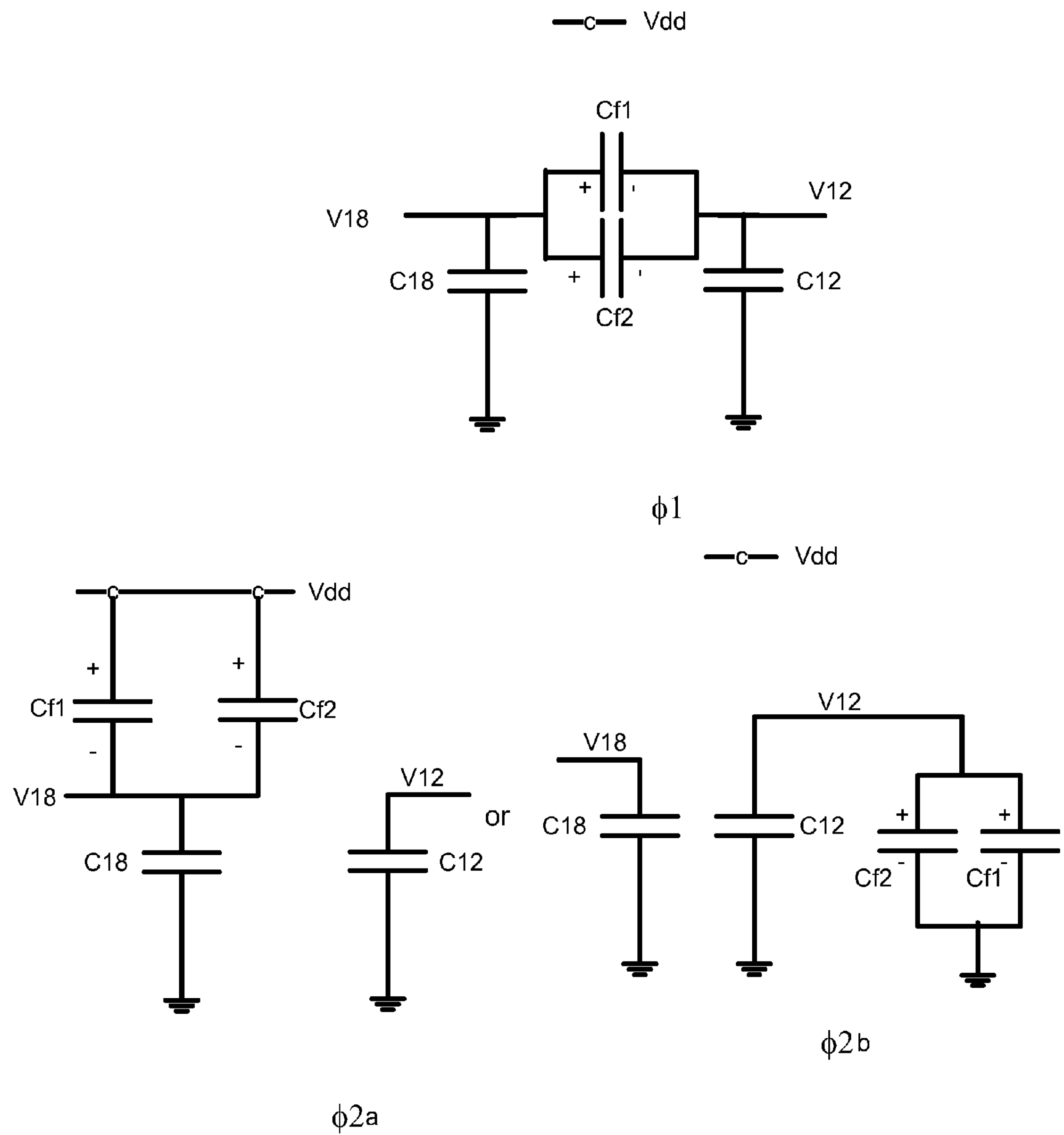
FIG. 5*b* depicts a second case using dual flying capacitors according to one embodiment.

FIG. 5*b* depicts a second case using dual flying capacitors according to one embodiment. As shown in phase 1, flying capacitor Cf is replaced by flying capacitors Cf1 and Cf2. In phase 2*a*, flying capacitor Cf is replaced by flying capacitors Cf1 and Cf2. In phase 1, the operation is similar as discussed with respect to FIG. 2*b*, except the voltage across flying capacitor Cf is split between flying capacitors Cf1 and Cf2. However, in phase 2*a*, the ΔV is greater because the voltage across flying capacitors Cf1 and Cf2 is split between them. In phase 2*b*, the operation is similar to that described with respect to phase 2 of FIG. 5*a*.

Figure 5C:
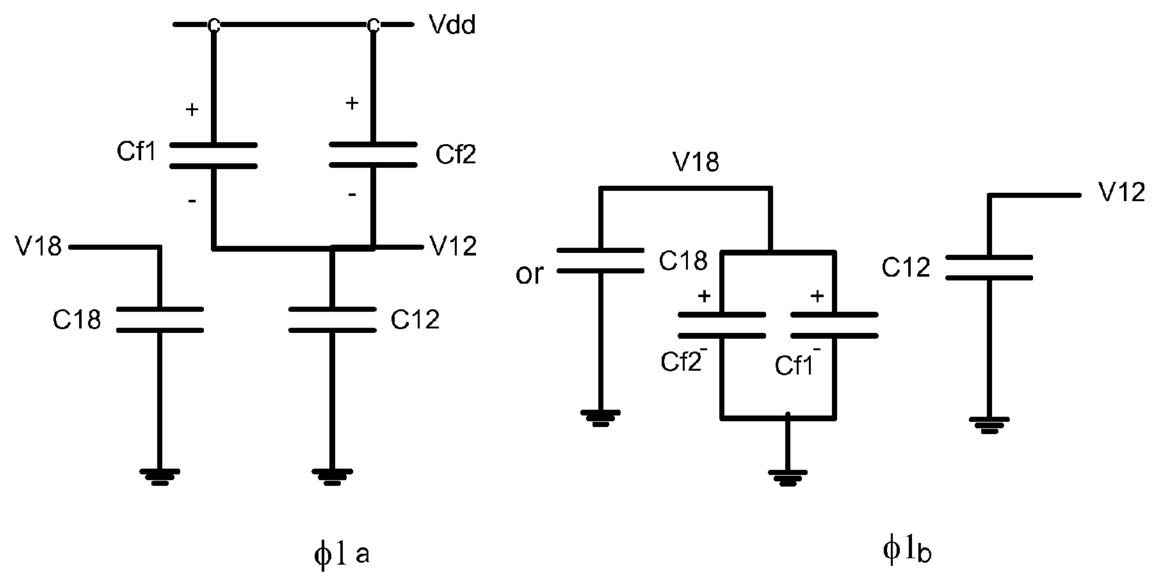
FIG. 5*c* depicts a third case using dual flying capacitors according to one embodiment.
Figure 5C:
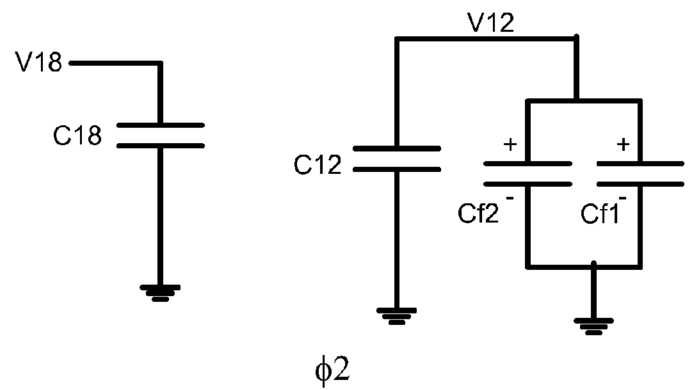

FIG. 5*c* depicts a third case using dual flying capacitors according to one embodiment. In phase 1, a circuit is similar to phase 1*a* in FIG. 5*a* except that flying capacitors Cf1 and Cf2 have their second terminal coupled to reference voltage Vdd and their first terminal coupled to capacitor C12 and output voltage V12. In this case, the voltage difference ΔV is increased because the voltage across flying capacitor Cf is split between flying capacitors Cf1 and Cf2. In phase 1*b*, the flying capacitor Cf is replaced by flying capacitors Cf1 and Cf2 in series. Charge is transferred from capacitor C18 to flying capacitors Cf1 and Cf2. Also, in phase 2, flying capacitor Cf is replaced by flying capacitors Cf1 and Cf2 in series, which is similar to that shown in phase 2 of FIG. 5*a*. In this case, charge across flying capacitors Cf1 and Cf2 is transferred to capacitor C12.

In the fourth case, flying capacitors Cf1 and Cf2 are floating and thus the operation is the same as described with respect to FIG. 2*b*.

Figure 6:
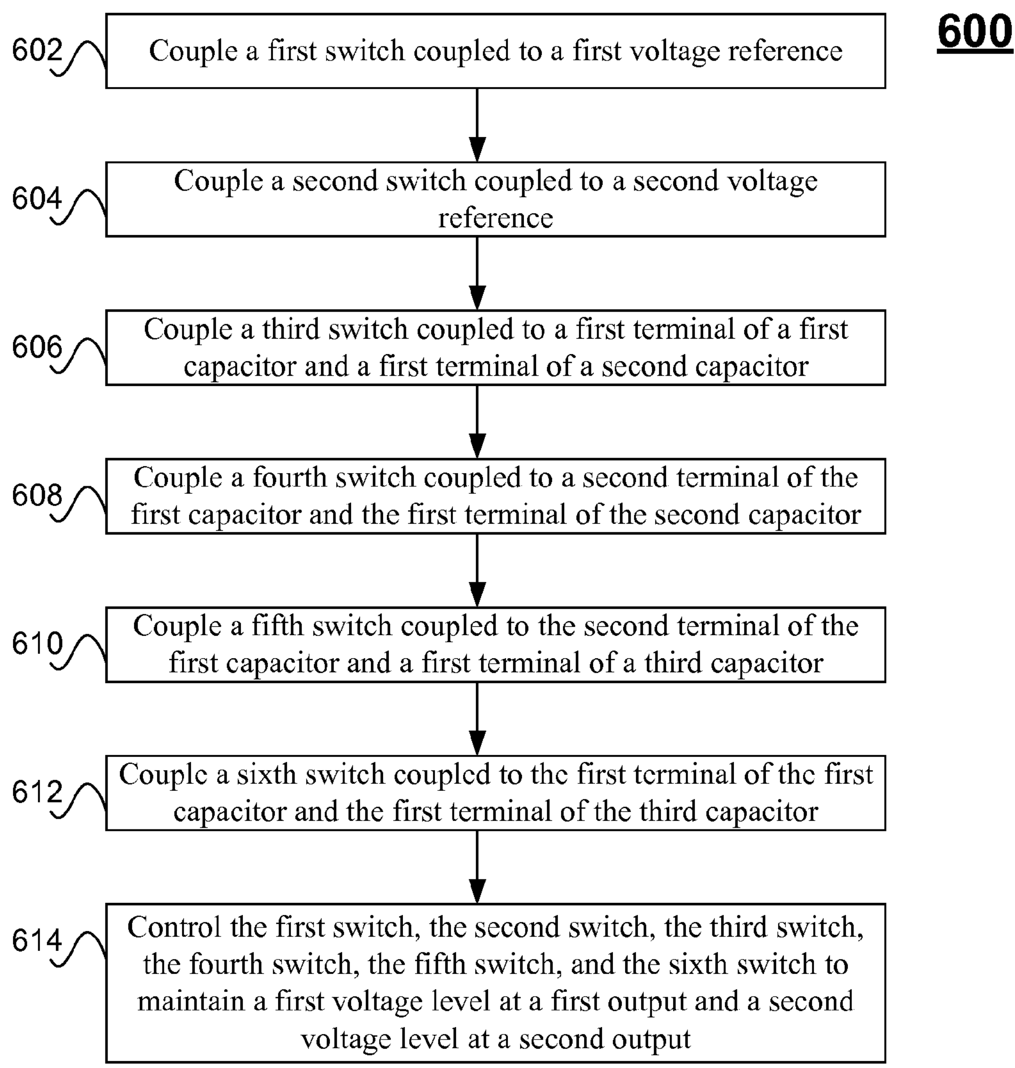
FIG. 6 depicts a method for maintaining a first voltage level at a first output and a second voltage level at a second output according to one embodiment.

FIG. 6 depicts a method for maintaining a first voltage level at a first output and a second voltage level at a second output according to one embodiment. At 602, regulator 100 couples a first switch coupled to a first voltage reference. At 604, regulator 100 couples a second switch coupled to a second voltage reference.

At 606, regulator 100 couples a third switch coupled to a first terminal of a first capacitor and a first terminal of a second capacitor. At 608, regulator 100 couples a fourth switch coupled to a second terminal of the first capacitor and the first terminal of the second capacitor. At 610, regulator 100 couples a fifth switch coupled to the second terminal of the first capacitor and a first terminal of a third capacitor. At 612, regulator 100 couples a sixth switch coupled to the first terminal of the first capacitor and the first terminal of the third capacitor.

At 614, regulator 100 controls the first switch, the second switch, the third switch, the fourth switch, the fifth switch, and the sixth switch to maintain a first voltage level at a first output and a second voltage level at a second output.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. An apparatus comprising:

a first switch coupled to a first voltage reference;

a second switch coupled to a second voltage reference;

a third switch coupled to a first terminal of a first capacitor and a first terminal of a second capacitor;

a fourth switch coupled to a second terminal of the first capacitor and the first terminal of the second capacitor;

a fifth switch coupled to the second terminal of the first capacitor and a first terminal of a third capacitor; and a sixth switch coupled to the first terminal of the first capacitor and the first terminal of the third capacitor, wherein the first switch, the second switch, the third switch, the fourth switch, the fifth switch, and the sixth switch are controlled to maintain a first voltage level at a first output and a second voltage level at a second output.

2. The apparatus of claim 1, wherein:
the first switch and the sixth switch are closed to couple the first terminal of the first capacitor to the first terminal of the third capacitor,
the second switch, the third switch, the fourth switch, and the fifth switch are open, and
the second voltage level at the second output is increased.

3. The apparatus of claim 2, further comprising a fourth capacitor coupled to the first reference voltage and the first terminal of the third capacitor.

4. The apparatus of claim 2, wherein:
the second switch and the fourth switch are closed to couple the second terminal of the first capacitor to the first terminal of the second capacitor,
the first switch, the third switch, the fifth switch, and the sixth switch are open, and
the first voltage level at the first output is increased.

5. The apparatus of claim 4, further comprising a fifth capacitor coupled to the second terminal of the first capacitor and the first terminal of the second capacitor.

6. The apparatus of claim 1, wherein:
the third switch and the fifth switch are closed to (i) couple the first terminal of the first capacitor to the first terminal of the second capacitor and (ii) couple the second terminal of the first capacitor to the first terminal of the third capacitor,
the first switch, the second switch, the fourth switch, and the sixth switch are open, and
the second voltage level at the second output is increased.

7. The apparatus of claim 6, wherein:
the first switch and the sixth switch are closed to couple the first terminal of the first capacitor to the first terminal of the third capacitor,
the second switch, the third switch, the fourth switch, and the fifth switch are open, and
the second voltage level at the second output is increased.

8. The apparatus of claim 6, wherein:
the second switch and the fourth switch are closed to couple the second terminal of the first capacitor to the first terminal of the second capacitor,
the first switch, the third switch, the fifth switch, and the sixth switch are open, and
the first voltage level at the first output is increased.

9. The apparatus of claim 1, wherein:
the first switch and the third switch are closed to couple the second terminal of the first capacitor to the first voltage reference and the first terminal of the first capacitor to the first terminal of the second capacitor,
the second switch, the fourth switch, the fifth switch, and the sixth switch are open, and
the first voltage level at the first output is increased.

10. The apparatus of claim 9, wherein:
the second switch and the fourth switch are closed to couple the second terminal of the first capacitor to the first terminal of the second capacitor,
the first switch, the third switch, the fifth switch, and the sixth switch are open, and
the first voltage level at the first output is increased.

11. The apparatus of claim 1, wherein:
the first switch and the fifth switch are closed to couple the second terminal of the first capacitor to the first terminal of the third capacitor,
the second switch, the third switch, the fourth switch, and the sixth switch are open, and
the second voltage level at the second output is decreased.

12. The apparatus of claim 1, wherein the first switch, the second switch, the third switch, the fourth switch, the fifth switch, and the sixth switch are open to maintain the first voltage level and the second voltage level.

13. The apparatus of claim 1, further comprising:
a seventh switch coupled to the first voltage reference;
an eighth switch coupled to the second voltage reference;
a ninth switch coupled to a first terminal of a fifth capacitor and the first terminal of the second capacitor;
a tenth switch coupled to a second terminal of the fifth capacitor and the first terminal of the second capacitor;
an eleventh switch coupled to the second terminal of the fifth capacitor and the first terminal of the third capacitor; and
a twelfth switch coupled to the first terminal of the fifth capacitor and the first terminal of the third capacitor.

14. The apparatus of claim 1, further comprising a thirteen switch coupling the second terminal of the first capacitor with the first terminal of the fifth capacitor.

15. The apparatus of claim 14, wherein:
the first switch and the sixth switch are closed to couple the first terminal of the first capacitor to the first terminal of the third capacitor,
the second switch, the third switch, the fourth switch, and the fifth switch are open, wherein the second voltage level at the second output is increased,
the seventh switch and the twelfth switch are closed to couple the first terminal of the fifth capacitor to the first terminal of the third capacitor,
the eighth switch, the ninth switch, the tenth switch, and the eleventh switch are open, and
the second voltage level at the second output is increased.

16. The apparatus of claim 14, wherein
the thirteen switch is closed to couple the second terminal of the first capacitor to the first terminal of the fifth capacitor, wherein the first voltage level at the first output is increased.

17. A system comprising the apparatus of claim 1, the system further comprising:
the first reference voltage;
the second reference voltage;
the first capacitor;
the second capacitor; and
the third capacitor.

18. A method comprising:
coupling a first switch coupled to a first voltage reference;
coupling a second switch coupled to a second voltage reference;
coupling a third switch coupled to a first terminal of a first capacitor and a first terminal of a second capacitor;
coupling a fourth switch coupled to a second terminal of the first capacitor and the first terminal of the second capacitor;
coupling a fifth switch coupled to the second terminal of the first capacitor and a first terminal of a third capacitor;
coupling a sixth switch coupled to the first terminal of the first capacitor and the first terminal of the third capacitor; and
controlling the first switch, the second switch, the third switch, the fourth switch, the fifth switch, and the sixth switch to maintain a first voltage level at a first output and a second voltage level at a second output.

19. The method of claim 18, further comprising:
closing the first switch and the sixth switch to couple the first terminal of the first capacitor to the first terminal of the third capacitor; and
opening the second switch, the third switch, the fourth switch, and the fifth switch, wherein the second voltage level at the second output is increased.

20. The method of claim 18, further comprising:

closing the second switch and the fourth switch to couple the first terminal of the first capacitor to the first terminal of the second capacitor; and opening the first switch, the third switch, the fifth switch, and the sixth switch, wherein the first voltage level at the first output is increased.

* * * * *